June 7, 1955     F. K. KUHN     2,709,945
ANTI-GLARE CURTAIN FOR AUTOMOBILE REAR VIEW MIRRORS
Filed Jan. 9, 1952
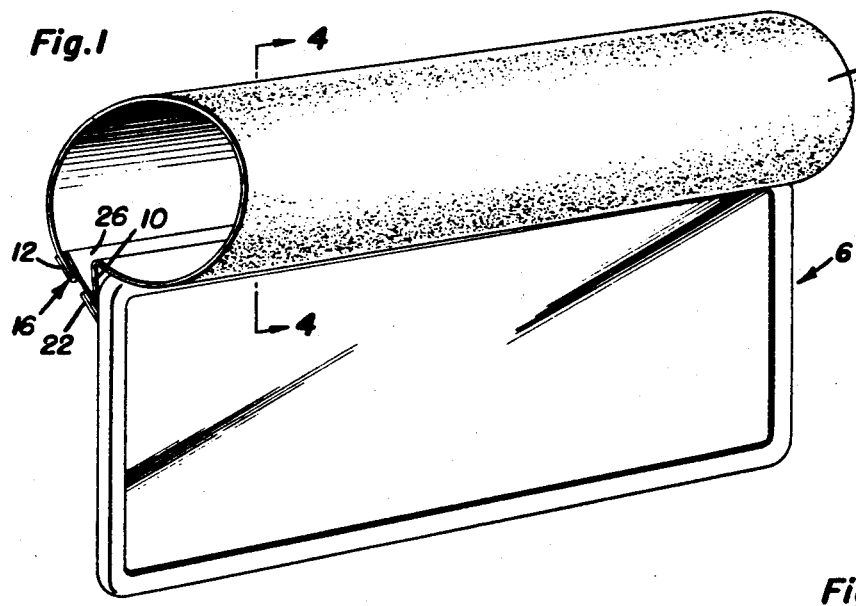
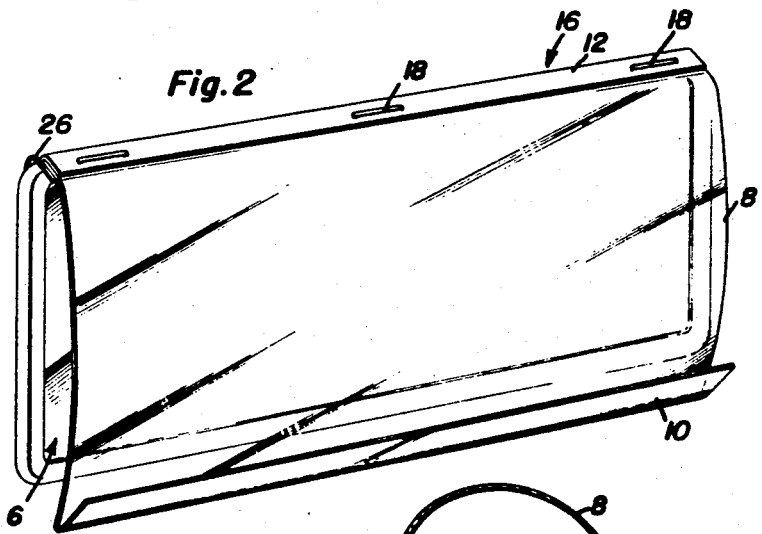
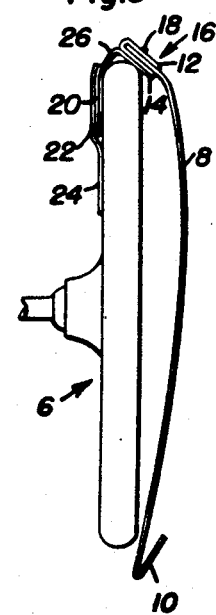
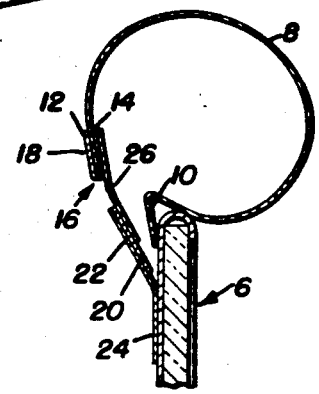
Fred K. Kuhn
INVENTOR.

United States Patent Office 2,709,945
Patented June 7, 1955

2,709,945

ANTI-GLARE CURTAIN FOR AUTOMOBILE REAR VIEW MIRRORS

Fred K. Kuhn, Paris, Ill.

Application January 9, 1952, Serial No. 265,568

2 Claims. (Cl. 88—77)

The present invention has to do with practical ways and means whereby an automobile rear view mirror may be employed with greater reliance and service while, at the same time, promoting safe driving by reason of the fact that glaring headlights on vehicles approaching from the rear will be less likely to momentarily or otherwise convert the rear view mirror into an objectionable light reflecting target.

Rear view mirrors are almost essential to drivers in safely handling automobiles and similar motor vehicles.

At the same time, when brilliantly shining headlights on a trailing vehicle beam objectionably into one's rear view mirror and reflect back into the driver's eyes, the rear view mirror momentarily becomes a menace. Of course, all sorts of so-called non-glare rear view mirrors have been experimented with and various kinds of covers and numerous practices are followed in attempting to safely cope with the situation stated.

The object of the instant invention is to provide simple, practical, economical and adequate anti-glare attachment for a rear view mirror which constitutes an acceptable safeguard and provides a simple and economical construction in which manufacturers, accessory salesmen and users will find their respective requirements and needs fully met.

Briefly, the preferred embodiment of the invention is a readily applicable attachment which is essentially characterized by a flexible drop curtain which may be allowed to drop down over the reflective surface of the mirror during the course of night driving and which is flexible and may be rolled up and moved to an out-of-the-way position when not in use, for example, during daytime driving.

More specifically, the invention has to do with a curtain of flexible sheet material, for instance, semi-transparent acetate, the same being fashioned into a curtain, means being provided for hingedly attaching the upper edge portion of the curtain to the rear view mirror and means being provided along an opposite longitudinal lower edge whereby the curtain may be momentarily and temporarily rolled up and suspended in an out-of-the-way position.

Other objects, features and advantages will become more readily apparent from the following description and the accompanying sheet of illustrative drawings.

In the accompanying sheet of drawings, wherein like numerals are employed to designate like parts throughout the views:

Figure 1 is a perspective view showing a conventional rear view mirror and showing the safety curtain attachment applied thereto;

Figure 2 is likewise a perspective view with the curtain in its down ready-to-use position;

Figure 3 is an end elevation of the structure seen in Figure 2 observing the same in a direction from left to right; and Figure 4 is a vertical section taken on the plane of a vertical line 4—4 of Figure 1, looking in the direction of the arrows.

Taking up now the various views and referring to the parts and elements thereof by reference numerals and lead lines the rear view mirror is, of course, a conventional accessory and is of any suitable construction and is here denoted by the numeral 6. The drop curtain, which is in effect an anti-glare cover, is a simple sheet of appropriate semi-transparent material and the same is denoted by the numeral 8. It is of general rectangular form and of an area greater than the area of the mirror so that it will hang down and completely cover the mirror. In practice, commercial sheet plastics have been found acceptable and also a sheet of acetate, specifically, is practical and it is possible to paint or otherwise coat one side thereof, as shown by stippling in Figure 1, whereby to render the over-all sheet semi-transparent and to provide the desired anti-glare properties. The lower longitudinal edge portion is substantially rigid and is fashioned into a lengthwise return bend or hook 10 commensurate in length with the over-all length of the curtain. This is adapted to be hooked over the frame of the rear view mirror in the manner shown in Figure 4; that is, when the curtain is rolled up, so to speak, and hung on the rear view mirror. The upper longitudinal edge portion of the curtain is located in the channel between coacting flanges 12 and 14 on a channel-shaped sheath 16. The latter is preferably of cardboard and the flanges are secured to the acetate sheet by staples or the like 18. The numeral 20 designates another length of cardboard or the like and this is superimposed upon and attached to an adhesive surface of the portion 22 of a suitable length of tape, the opposite edge portion of the tape, as at 24, being secured to the back of the mirror. A flexible connecting web of fabric or the like is denoted at 26 and this has one edge portion glued or otherwise attached to the cardboard strip 20 and the other edge portion attached to the flange 14. This provides anchor means and hinging and attaching means for the sheathed edge portion of the curtain.

It is believed that the preceding statement of the objectives and accompanying detailed description will be sufficient when considered in conjunction with the drawings to enable the reader to fully comprehend the invention, the manner in which it is brought into use, as shown in Figures 2 and 3, and moved to an out-of-the-way position, as shown in Figures 1 and 4. Therefore, a more lengthy description is thought to be unnecessary.

Having described the invention, what is claimed as new is:

1. A flexible drop curtain which may be allowed to drop down over the reflecting surface of a rear view mirror during the course of night driving and which is flexible and may be rolled up and moved to an out-of-the-way position and supported on the rear view mirror when not in use comprising a sheet of flexible anti-glare material of a size and shape to function as the aforementioned temporarily useable drop curtain, a relatively rigid sheath secured lengthwise and completely across the upper longitudinal edge portion of said mirror, the lower edge portion of said curtain being formed into a relatively rigid lengthwise hook, the free edge portion of said hook facing in a direction projecting upwardly and rearwardly from the face of the mirror when the curtain is down and so that it will be in a correct position when the curtain is rolled up to allow said hook to be temporarily hooked over the upper edge of the rear view mirror, a piece of flexible strip material adapted to be secured to the reverse side of the upper portion of the rear view mirror, and a strip of fabric secured along one edge of said strip material and along its opposite edge to the sheath so as to provide a free hinging connection between the sheath and strip.

2. A flexible drop curtain which is applicable to a rear view mirror and which may be allowed to drop down over the reflecting surface of said mirror during the course of night driving and which is flexible and may be rolled up and moved to and held in an out-of-the-way position on the upper edge of the rear view mirror when not in use comprising a sheet of flexible anti-glare material of a size and shape to hang down over and cover the reflective surface of said mirror, the lower edge portion of said material having a lengthwise return bend defining a relatively rigid hook, said hook being of a length commensurate with the length of the sheet material and the free edge portion thereof facing rearwardly in respect to the mirror and being directed upwardly when the curtain is down so that said hook will be in satisfactory position, when the curtain is rolled up to an out-of-the-way position, to be temporarily hooked over the upper edge of the rear view mirror, a relatively rigid sheath of a length commensurate with the length of said sheet material, the upper edge of the latter being fitted into the channel portion and secured between the flanges of the sheath, and means for hingedly attaching said sheath to the reverse side of said rear view mirror, said means comprising a strip of cardboard, adhesive tape having an edge portion secured to said cardboard and having a free edge portion which is adapted to be secured to the reverse side of the mirror, and a strip of fabric having an edge portion secured to said strip of cardboard and its other edge portion secured to one of the flanges of said sheath.

References Cited in the file of this patent
UNITED STATES PATENTS

| | | |
|---|---|---|
| 884,222 | Sherman et al. | Apr. 7, 1908 |
| 1,743,575 | Smith | Jan. 14, 1930 |
| 2,627,246 | Wolk | May 5, 1953 |